United States Patent
Joet et al.

(10) Patent No.: US 7,634,247 B2
(45) Date of Patent: Dec. 15, 2009

(54) METHOD OF SAMPLING AN ANALOGUE RADIOFREQUENCY SIGNAL

(75) Inventors: Loïc Joet, Grenoble (FR); Daniel Saias, Paris (FR); Eric Andre, Hurtières (FR)

(73) Assignee: STMicroelectronics S.A., Montrouge (FR)

(*) Notice: Subject to any disclaimer, the term of this patent is extended or adjusted under 35 U.S.C. 154(b) by 428 days.

(21) Appl. No.: 11/664,149

(22) PCT Filed: Mar. 15, 2005

(86) PCT No.: PCT/EP2005/002716

§ 371 (c)(1),
(2), (4) Date: Mar. 29, 2007

(87) PCT Pub. No.: WO2006/039949

PCT Pub. Date: Apr. 20, 2006

(65) Prior Publication Data

US 2007/0259620 A1    Nov. 8, 2007

(30) Foreign Application Priority Data

Oct. 12, 2004    (FR)   ................................. 04 10760

(51) Int. Cl.
*H04B 1/30* (2006.01)
(52) U.S. Cl. ...................... 455/323; 455/333
(58) Field of Classification Search ............... 455/313, 455/323, 324, 325, 326, 333, 334
See application file for complete search history.

(56) References Cited

U.S. PATENT DOCUMENTS

| | | | |
|---|---|---|---|
| 5,640,698 A | 6/1997 | Shen et al. | |
| 6,957,057 B2 * | 10/2005 | Das | 455/333 |
| 7,006,813 B2 * | 2/2006 | Staszewski et al. | 455/323 |
| 2005/0233725 A1 * | 10/2005 | Muhammad et al. | 455/339 |
| 2007/0264960 A1 * | 11/2007 | Lin et al. | 455/323 |

FOREIGN PATENT DOCUMENTS

EP    0 961 406 A    5/1999

OTHER PUBLICATIONS

International Search Report from corresponding International Application No. PCT/EP2005/002716, filed Mar. 15, 2005.
Muhammad K. et al, *Direct RF Sampling Mixer With Recursive Filtering in Charge Domain*, Circuits and Systems, 2004, ISCAS '04 Proceedings of the 2004 International Symposium on Vancouver, BC, Canada, May 23-26, 2004, pp. I-557, XP010719181.

* cited by examiner

*Primary Examiner*—Blane J Jackson
(74) *Attorney, Agent, or Firm*—Lisa K. Jorgenson; James H. Morris; Wolf, Greenfield & Sacks, P.C.

(57) ABSTRACT

A method for sampling an analogue radiofrequency signal comprising reception of the analogue radiofrequency signal, sending of the received signal on two analogue channels, each channel performing a first signal sampling operation, including a filtering step eliminating signal frequencies that could fold on the useful signal during sampling such that the sampled signal represents a filtered version of the received signal, wherein the sampling frequency is taken to be equal to the frequency of the signal carrier divided by a factor $Ndiv1+\frac{1}{2}$, $Ndiv1$ being an integer number, to bring the useful signal to half of the sampling frequency after sampling.

15 Claims, 3 Drawing Sheets

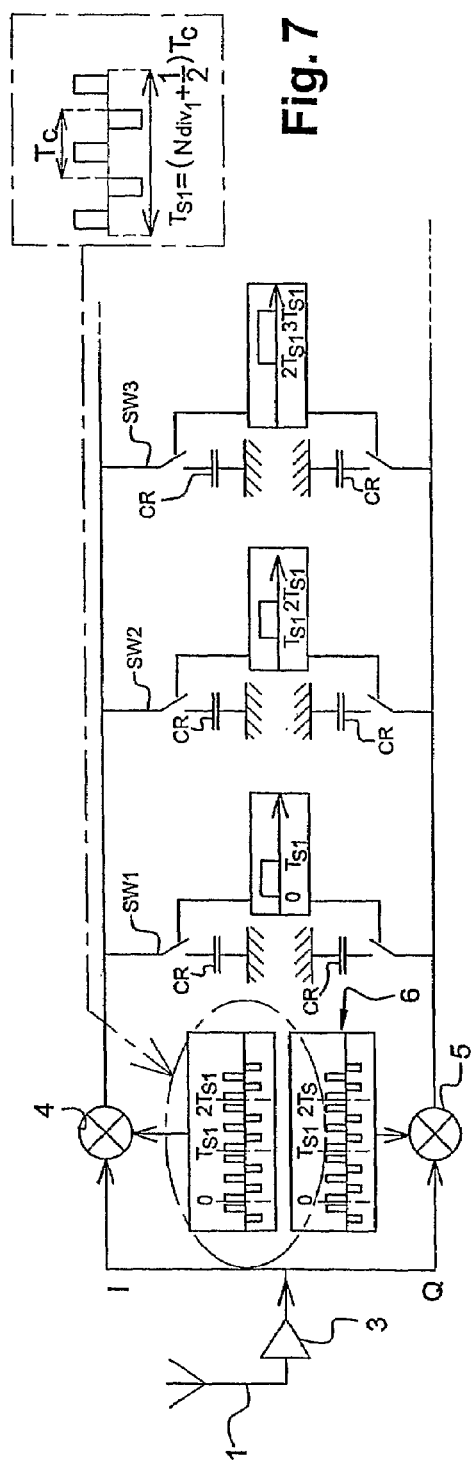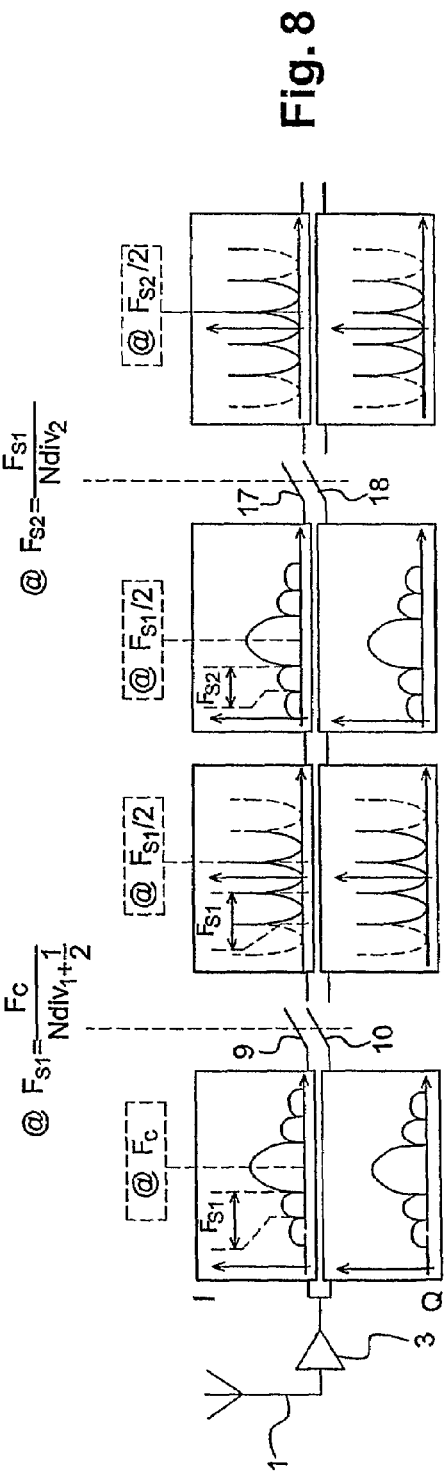

METHOD OF SAMPLING AN ANALOGUE RADIOFREQUENCY SIGNAL

BACKGROUND OF THE INVENTION

1. Field of the Invention

This invention relates to the radiofrequency reception field in general. More precisely, the invention relates to a method of sampling an analog radiofrequency signal and a device using this method. One particular example application of this invention is the mobile radiocommunication field that typically uses several communication channels within an allocated frequency band, for example radiocommunication systems according to the GSM (Global System Mobile) standard that use a 25 MHz frequency band centered on the 947.5 MHz frequency.

This invention more particularly relates to reception of information which, in such systems, needs be done by extracting only the frequencies of the channel considered to be received, called the useful channel, from the entire frequency band.

The useful channel is recovered by using filtering techniques at the receiver end to eliminate all frequencies located outside the useful channel frequency band, and techniques for converting analog RF signals into digital data streams for digital signal processing.

2. Discussion of the Related Art

In a context of reducing costs of reception systems, there are at least two strategic points; firstly the increase in the degree of integration in order to make a maximum number of elements on silicon to limit the number of external elements, and secondly the possibility of making the entire reception system using CMOS technology with minimum options. Since the CMOS technology is typically the technology used for digital processing, using the same technology to perform analog functions in the reception system means that a single circuit can be used for all digital and analog functions, thus reducing costs.

The state of the art proposes radiofrequency reception systems with frequency conversion with a low intermediate frequency (called "close to zero") with a so-called "low-IF" architecture, and direct conversion systems with zero intermediate frequency, called "zero-IF", consisting of transposing the radio signal directly into a base band.

However, when it is required to respect the constraints mentioned above in order to reduce manufacturing costs, each of these architectures, namely the "low-IF" or "zero-IF" introduces distinct problems.

FIG. 1 shows a classical "low-IF" architecture for a radiofrequency signal reception device. This architecture results in interfacing analog radio modules with a digital processing system operating at a relatively low intermediate frequency, close to zero. Information is then processed at this intermediate frequency, so that low pass filters can be used for processing the signal, since pass-band filters are hard to make on a circuit.

More precisely with reference to FIG. 1, the radiofrequency signals received from an antenna 1 pass through a filter 2, that has the function of rejecting frequencies outside the reception band of the system considered. The filter 2 is followed by a low noise amplifier (LNA) 3 to enhance the signal. The output from the amplifier 3 is sent on two channels, namely the I and Q channels respectively each including a mixer 4, 5 for converting the frequency to a low intermediate frequency. To achieve this, the mixer 4 receives a frequency corresponding to the sum of the intermediate frequency and the signal carrier frequency on its second input connected to a local oscillator 6, in the first channel. The effect is to bring the signal to the intermediate frequency. The frequency of the local oscillator is chosen to obtain a low non-zero intermediate frequency. In the second channel, the signal is multiplied at the mixer 5 by the same frequency, and is then phase shifted by 90 [deg.] such that the corresponding outputs of the mixers 4, 5 are in phase and in phase quadrature.

This signal duplication between the I and the Q channels avoids the loss of information that would otherwise occur during aliasing of the image on the signal when the signal is brought to the intermediate frequency and thus eliminates the need for the presence of a band cutoff filter in high frequencies to eliminate the image frequency which is difficult to achieve.

Each mixer 4, 5 is followed by a low pass filter (LPF) 7, 8 respectively to eliminate channels adjacent to the channel that is to be received and parasite frequencies due to aliasing. When a signal being sampled at a sampling frequency Fech includes frequency components with a frequency of more than Fech/2, these frequency components are folded thus possibly submerging the useful signal (phenomenon called "aliasing" in the literature).

Therefore, to avoid the aliasing phenomenon, the passband of the signal to be processed has to be limited to half of the sampling frequency, so as to respect the sampling theorem.

The signal can thus be sampled in 9, 10 without worrying about aliasing and the signal can then be digitized, for example using sigma-delta type analog-digital converters 11, 12 (ADC).

One disadvantage of this architecture is in the production of low-pass filters. Active filtering is used to avoid signal attenuation. The production of amplifiers necessary to make these filters is complex and requires the use of expensive technological options such as double oxide or high density capacitances. Thus in integrated circuits, it is usually not possible to integrate such a filter on the same circuit as the circuit containing the sampling circuit and the digital circuitry, without increasing manufacturing costs.

Also, due to this complexity, technology migrations providing the means of tending to a greater integration density of circuits will be difficult to apply for such an architecture since the size of filters cannot be reduced in the same way as transistors.

Direct conversion architectures, called zero-IF architectures, can limit the disadvantages related to the image frequencies phenomenon. Although zero-IF architectures introduce the same image frequency and IQ channels problem, the difference is that the image frequency is the negative part of the signal that folds onto the positive part. Therefore the power of the image frequency is limited, unlike low-IF in which the image is one of the adjacent channels with a much higher power than the signal.

In the direct conversion system, a frequency corresponding to the central frequency of the reception channel considered, namely the carrier frequency output by the local oscillator, is received on the second input of each of the two mixers 4, 5. Therefore the local oscillator outputs the same frequency (approximately) as the frequency to be received. Therefore mixer outputs 4 and 5 output the signal received in baseband directly provided that the frequency of the local oscillator is chosen such that the intermediate direct conversion frequency is zero.

However, noise at 1/f is a major problem for these architectures, in particular, when the integrated RF circuits of the reception system are made using CMOS technology. The low frequency noise, called noise at 1/f, that characterises these transistors is superposed on the converted signal, such that any signal that is too close to zero is submerged. Therefore the use of CMOS technology in the reception system means that the signal cannot be brought to base band before it has been digitized. Therefore the zero-IF architecture cannot be used.

Therefore, a new architecture has been proposed by the Texas Instruments Company for a Bluetooth type receiver based on a new radiofrequency sampling technique, to eliminate active filtering in FIG. 1. This technique is presented in an article entitled "Direct RF Sampling Mixer With Recursive Filtering In Charge Domain" by Khurram Muhammad and Robert Staszewski, presented at the ISCAS 2004 conference held in May 2004. The reader could also usefully refer to documents in US patents 2003/0083852 and 2003/0083033 for further information about the sampling and filtering techniques described below. A multifrequency reception device based on this sampling technique is shown diagrammatically in FIG. 2. Elements in common with the elements in FIG. 1 are marked with the same references. The principle is to transfer sampling 9, 10 in each channel I and Q into the reception system, as close as possible to the antenna. However, the difficulty to be taken into account lies in the aliasing phenomenon due to sampling.

Therefore a filter, called the anti-alias filter, is necessary to take account of this phenomenon. Advantageously, in the solution proposed by the company mentioned above, simple passive filters with switched capacitances may be used, thus replacing active filtering that is difficult to use in traditional architectures described in FIG. 1. Therefore, the function of this type of filter with references 13 and 14 in FIG. 2 for each I and Q channel respectively, is to filter all alias frequencies of the signal before they submerge the signal during sampling. Once the signal has been sampled, it still needs to be filtered to eliminate channels adjacent to the channel to be received, this operation being done by blocks 15 and 16, and it still needs to be undersampled such that the frequency of the analog-digital converter is acceptable.

More precisely, considering an example according to a time representation, consider a signal with frequency fc and a signal with frequency f=fc+n·fs, where fs is the sampling frequency, it can be observed that the two signals have exactly the same value at an interval having a value Ts (sampling period). Thus, when the signal is sampled, the acquired samples cannot be used to find the original signal since solutions with the same frequency are superposed, and in particular the frequency fc cannot be distinguished from frequency fc+fech, frequency fc+2fech, etc. In other words, all frequencies are folded on themselves at the sampling frequency.

However, this aliasing phenomenon has the advantage of reducing the frequency of the signal to be digitized. The highest usable frequency is equal to half of the sampling frequency. Thus, it is impossible to have a useful signal with a frequency more than half the sampling frequency. Sampling of the signal introduces the same spectrum offset by k times fs, in other words at fs, 2fs, etc., in addition to the signal spectrum.

Therefore, the constraint is to provide an anti-alias filter with the role of destroying all parasite frequencies at fc+fs or fc−fs, fc+2s or fc−2fs, fc+3fs or fc−3fs, etc., prior to sampling.

Therefore, the anti-alias filter must be centered on the carrier with its zeros spaced at the sampling frequency. In the solution recommended by Texas Instruments, the anti-alias filter is centered on the zero frequency and has a transfer function A as shown in FIG. 3, describing the cardinal sine function. Therefore it is essential to bring the signal into the baseband before filtering it, so as to use the entire power of the anti-alias filter.

The anti-alias filter shown in FIG. 3 passes through zero, in other words there is no signal attenuation, and the filter includes zeros at every multiple of fs, such that frequencies located at these precise locations of the filter spectrum are cut off. These frequencies are the alias frequencies that are to be eliminated.

The anti-alias filter transfer function is explained as described with reference to FIG. 4, which shows a sampler mixer circuit performing the filtering and sampling functions of blocks 13, 9 and 15, and 14, 10 and 16 respectively as shown in FIG. 2. Each I and Q channel includes such a circuit. The anti-alias filter function is actually included into the sampling operation. Thus, the filter operation filters the received analog signal such that the signal sampled at a given sampling frequency represents a filtered version of the analog signal from which parasite frequencies have been removed.

This is done by firstly converting the RF analog signal into current iRF using the LNA amplifier that is designed to output in current. The current is then sent to either the positive side VIF+ or the negative side V1F− of the circuit, taking account of the pseudo-differential structure that is represented. An LO+, LO− mixer on each side is present to bring the useful signal to zero, multiplying it by the carrier frequency. After the mixer, the current is then integrated into a sampling capacitor reset to zero for each sample. More precisely, a first signal sample is obtained bypassing the current iRF in the first capacitor CR during the sampling period chosen from 0 to Ts. This is done by making the MOS switch SA conducting from 0 to Ts. This is equivalent to integrating the signal over the sampling period after having multiplied it by the carrier frequency. A second signal sample is then obtained by integrating the current in a second capacitor CR during the period from Ts to 2Ts, with the MOS switch SAZ being made conducting from Ts to 2Ts and so on. By integrating the signal over such a time window corresponding to the sampling period, a time convolution is reconstructed. In frequency, this is equivalent to multiplying the signal with a cardinal sine (which is the Fourrier transform of the time window). The transfer function thus produced corresponds to the anti-alias filter in FIG. 3. The filter spectrum made is a cardinal sine centered on zero frequency.

Once the signal has been sampled, it needs to be filtered and possibly undersampled such that the converter frequency is acceptable.

A low pass type filter to eliminate channels adjacent to the useful channel that is to be received is thus made using the capacitor CH in the circuit in FIG. 4 called the memory capacitance, which is charged by the current iRF and that is not intended to be reset to zero. To do the filtering, each acquired sample is averaged with this capacitance CH, one after the other. Thus in a first step, the amplifier outputting in current outputs into the capacitance CR, and in a second step the capacitance CR is averaged with the capacitance CH, which is never reset to zero and therefore keeps the memory of the signal. The spectrum of the filter B is then obtained as shown in FIG. 3 in dashed lines, in which it can be seen that all frequencies around the required signal are filtered. Curve C then represents the combination of these two filter operations: anti-alias filtering and filtering of adjacent channels.

A final filtering operation acting as an anti-alias filter for additional undersampling may also be used. The first sampling is made at a fairly high frequency that is not adapted to the working frequency of the converter. To divide the sampling frequency by N, the last N capacitances CR representative of the last N acquired signal samples, are averaged among themselves. The result is the transfer function as shown in FIG. 5. This filter does not make any attenuation at zero frequency at which the signal is located and includes zeros at all multiples of fs/N, in other words frequencies that could fold on the useful band. In this way, no parasite frequency submerges the signal during sampling.

All operations described above are controlled by clock signals generated by circuits not shown.

All filters presented with reference to FIGS. 2 to 5 are passive filters with switched capacitances, which can therefore be easily made using CMOS technology and can therefore be easily integrated.

As we have already seen, use of CMOS technology introduces the problem of noise at 1/f. Consequently, this noise makes it impossible to bring the signal into the base band. As the distance from the zero frequency decreases, the noise due to MOSs increases. Therefore an intermediate frequency has to be used to offset the useful band from zero, according to the low-IF principle. Thus, in the application chosen by Texas Instruments for a Bluetooth receiver, the signal is firstly brought to a low intermediate frequency, and is then sampled and cleaned by the filters presented above.

However, by choosing an intermediate frequency not equal to zero, the useful signal is completely offset from the spectrum of the filters presented in FIGS. 3 and 5, which are centered on zero. Since these filters are fairly aggressive, as soon as the signal moves away from the peak centered at zero as shown in FIG. 3, it will be significantly attenuated and deformed by filtering. Furthermore, the anti-alias filter will no longer have its zeros at the right location since the intermediate frequency of the signal has been offset. Therefore the signal is significantly modified by filtering and the alias frequencies are cut off less. Therefore, the proposed filters should be offset to match the intermediate frequency. However, filtering would no longer be symmetric. The result would then be imaginary filters in which the I and Q channels would have to be mixed before the filters could be used, which introduces serious problems when it is required to make digital corrections for bad matching of the channels.

Therefore, when making the Bluetooth receiver, a compromise had to be found between a sufficient offset of the useful signal frequency to avoid the noise at 1/f and the filtering power. Such a compromise will be difficult to find, for example for adaptation of such a receiver to the GSM (Global System for Mobile Communications) Standard or the UMTS (Universal Mobile Telecommunication System) standard. In these systems, parasite frequencies and adjacent channels are more powerful, so that more pronounced filtering is necessary. A signal offset from the filter would then be excessively modified. Therefore, the use of this architecture is limited for standards stricter than Bluetooth.

Another problem of this architecture is the image frequency. When the signal is brought directly to zero-IF, the image is exactly symmetric with the signal, which means that the negative part submerges the positive part. The information can then easily be found by combining use of the two channels I and Q. In the case of the "low-IF", when the signal is brought around an intermediate frequency, the signal is submerged by the adjacent channels. It is then more difficult to eliminate the image frequency and to find the required information using the I and Q channels. According to the standard, as the intermediate frequency increases, the image frequency moves further from the useful band and its power increases. Since matching of the I and Q channel is dependent on the power of the image to be eliminated, matching needs to be very good, particularly when the intermediate frequency is high.

SUMMARY OF THE INVENTION

Thus, passing through an intermediate frequency increases constraints on the circuit concerning matching of the I and Q channels to guarantee the elimination of the image frequency. Therefore, this invention is aimed at proposing a new sampling method for an analog radiofrequency signal, this method also filtering the analog signal such that the sampled signal represents a filtered version of the analog signal, which overcomes the disadvantages of classical solutions. In particular, this invention is intended to overcome the problem related to low frequency noise at 1/f while limiting problems of the image power to be eliminated. This invention is also intended to propose a solution that optimizes the possibility of integrating radiofrequency reception systems and which in particular maintains the advantages related to the use of filters described previously with reference to FIG. 2 and subsequent figures.

With this and other objectives in mind, the purpose of the invention is a sampling method for an analog radiofrequency signal comprising reception of the analog radiofrequency signal, sending the received signal on two analog channels, each channel performing a first signal sampling operation including a filtering step eliminating signal frequencies that could fold on the useful signal during sampling such that the sampled signal represents a filtered version of the received signal, wherein the sampling frequency is taken to be equal to the frequency of the signal carrier divided by a factor $Ndiv1 + \frac{1}{2}$, where $Ndiv1$ is an integer number, to bring the useful signal to half of the sampling frequency after sampling. According to one embodiment, the sampling operation including the anti-alias filtering step comprises generating filtered samples of the received signal at the sampling frequency. by successively integrating the received signal over the sampling period after having multiplied it by the carrier frequency for which the phase is zero at the beginning of each sampling period.

Advantageously, each successive integration comprises a signal convolution with the carrier frequency seen on a time window with its width equal to the sampling period, making a cardinal sine type filter centered on the carrier frequency of the signal with zeros of the filter separated by multiples of the sampling frequency.

Preferably, samples of the received signal are produced by a plurality of capacitors forming a sampling circuit, the received signal previously being converted into current form and then integrated in each of the said transistors successively, the charge accumulated during the sampling period being representative of a filtered sample of the received signal.

According to one particular embodiment, the received signal is subjected to at least one additional sampling operation at a new sampling frequency, including an anti-alias filtering step, bringing the useful signal to half of the new sampling frequency after sampling, the new sampling frequency being determined as being equal to the sampling frequency of the last sampling operation applied divided by an odd integer number $Ndiv2$.

Advantageously, the plurality of sampling capacitors being doubled up on the positive side and negative side of the sampling circuit, the additional sampling operation comprises averaging the $Ndiv2$ samples taken alternatively on the positive side and negative side of the circuit among themselves, the averaging making a cardinal sine type filter centered on the half of the last sampling frequency chosen with zeros of the filter separated by multiples of the new sampling frequency.

Preferably, the sampling operation is followed by a filtering operation eliminating adjacent frequencies around the useful signal.

According to one particular embodiment, the filtering operation comprises averaging each sample with the charge accumulated by a memory capacitor, doubled up on the positive and negative side of the sampling circuit, the charge being representative of the received signal, the samples being averaged successively with the charge accumulated by the memory capacitor taken on the positive side and the negative side alternatively.

In one preferred embodiment, the sampling and filtering operations are done using CMOS technology.

The invention also relates to a device for sampling an analog radiofrequency signal including means for receiving the analog radiofrequency signal, a first mixer that mixes the received signal with a signal output from a local oscillator at the carrier frequency of the received signal, the output from the said first mixer defining a first channel that will be sampled, a second mixer that mixes the received signal with the said signal output from the said local oscillator in quadrature, the output from the second mixer defining a second channel that will be sampled, each mixer output being connected to sampling means including first filter means designed to previously eliminate frequencies of the mixed signal that could fold onto the useful signal during sampling, wherein the sampling means operate at a sampling frequency such that the ratio between the carrier frequency and the sampling frequency is equal to $Ndiv1+\frac{1}{2}$, where $Ndiv1$ is an integer number, so as to bring the useful signal to half of the sampling frequency after sampling.

According to one particular embodiment, each channel includes additional sampling means including anti-alias filtering means, the sampling means working at a new sampling frequency equal to the sampling frequency of the previous sampling means on the channel, divided by an odd integer number $Ndiv2$, so as to bring the useful signal to half of the new sampling frequency after sampling.

The device is also designed to also include second filtering means designed to eliminate adjacent frequencies around the useful signal.

According to one preferred embodiment, the device according to the invention is made in the form of an integrated circuit.

The invention also relates to a radiofrequency signal reception terminal, including a device according to the invention.

BRIEF DESCRIPTION OF THE DRAWINGS

Other characteristics and advantages of this invention will appear more clearly after reading the following description given as an illustrative and non-limitative example with reference to the attached figures in which:

FIG. 7 diagrammatically shows a sampling device implementing the principles of the invention, and FIG. 8 diagrammatically shows transfer functions of the various filtering operations implemented according to a particular embodiment of the invention.

DETAILED DESCRIPTION

Thus, this invention is aimed as reusing sampling and filtering techniques described above, but according to the invention, it is proposed to bring the useful signal to be processed to a particular predetermined frequency, chosen as being half of the sampling frequency. This particular frequency is attractive for several reasons that will become clear from the following description made with reference to FIG. 6. Firstly, to bring the useful signal after sampling to half the sampling frequency, the ratio between the carrier frequency of the signal Fc and the sampling frequency Fs needs to be equal to $Ndiv1+\frac{1}{2}$, the term $Ndiv1$ being defined as an integer number. Thus, the following relation needs to be respected: $Fc=(Ndiv1+\frac{1}{2})\cdot Fs$.

Figure 6:
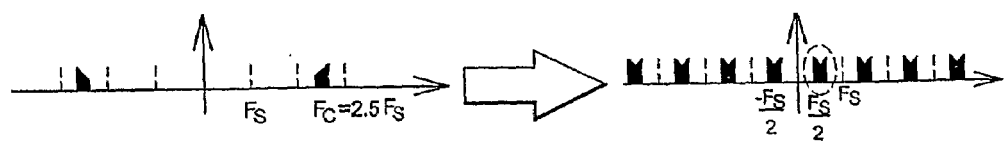
FIG. 6 shows the different advantages resulting from the signal spectrum aliasing phenomenon at a particular frequency determined according to the principles of the invention.

According to the example in FIG. 6, $Ndiv1$ is taken equal to 2. The spectrum of the signal located around $Fc=2.5Fs$ is shown at the left of the figure. After sampling, as shown on the spectrum at the right of the figure, the signal is folded to half of the sampling frequency Fs/2 due to the particular ratio of the frequencies.

It can be seen that if the signal is placed around Fs/2, the image is placed around −Fs/2. Sampling of the signal introduces the same spectrum offset by k times Fs, in addition to the signal spectrum. Thus, once sampled by choosing the sampling frequency such that $fs=fc/(Ndiv1+\frac{1}{2})$, the result is a periodic spectrum and the image is quite simply symmetric with the signal. The result is then advantageously the equivalent of the "zero-IF" structure in which the image is symmetric with the signal. The power of the image is no longer a problem and the information can easily be found by using the two I and Q channels. Therefore constraints on adaptation of the I and Q channels are the same as in a "zero-IF" structure. However, the problems inherent to the "zero-IF" structure are eliminated since the signal is located at Fs/2 which is an intermediate frequency not close to zero, and therefore problems with noise at 1/f and offset problems (parasite DC component that occurs in all RP systems) are avoided.

Therefore the particular frequency chosen provides the means of combining advantages related to the "zero-IF" structure related to elimination of the image power, and advantages related to the "low-IF" structure related to overcoming the problem related to offset and noise at 1/f.

However, the filters described above in relation to the Texas Instruments architecture still have to be adapted so that they can be reused taking account of the fact that the useful signal is brought to half of the sampling frequency after sampling.

Concerning the anti-alias filter to eliminate parasite frequencies that could disturb the useful signal during aliasing, its production in accordance with the principle of the invention is described with reference to FIG. 7 that describes an analog radiofrequency signal sampling device including means of receiving the analog radiofrequency signal formed by antenna 1, the amplifier 3 outputting in current as explained above, and the two I and Q channels with mixers 4 and 5 (however, an amplifier outputting in voltage and a mixer outputting in current could be envisaged). FIG. 7 is actually a simplified representation of the sampler mixing circuit in FIG. 4. We have seen that an anti-alias filter can be obtained by integrating the signal after having multiplied it by the carrier. According to the invention, instead of bringing the signal into the baseband where the anti-alias filter is located (as explained with reference to the architecture according to prior art) the filter spectrum will be projected to the level of the signal carrier.

To achieve this, each of the channels to be sampled includes a mixer 4, 5 mixing the received signal with a signal output from a local oscillator 6 at the frequency Fc of the received signal carrier and comprising pi phase skips (phase opposition) in each sampling period, the signal output by the local oscillator to the mixer 5 of the Q channel being in quadrature with respect to the signal output for the I channel. Bringing the useful signal to half of the sampling frequency during sampling imposes the condition that Fc=(Ndiv1+½)·Fs, where Ndiv1 is an integer.

Figure 4:
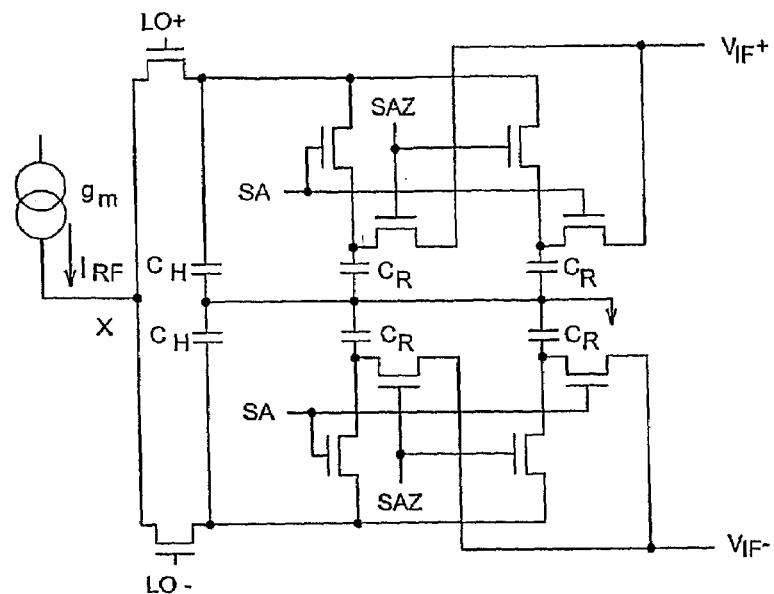
FIG. 4 shows a sampler mixing circuit performing filtering and sampling block functions in FIG. 2 and has already been described.
Figure 5:
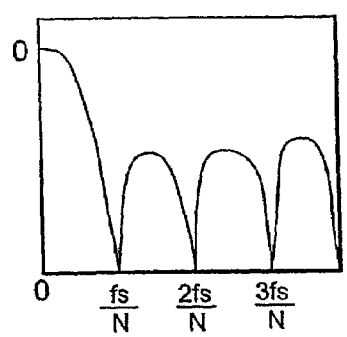
FIG. 5 shows the transfer function of the anti-alias filter before an additional undersampling according to the architecture in FIG. 2 and has already been described.

The output from each mixer is sent to a plurality of sampling capacitors CR each controlled by switches SW1, SW2, SW3 respectively, the function of which has already been described with reference to FIG. 4.

Thus, the first signal sample is obtained by passing current in the first capacitor CR during the sampling period chosen from 0 to Tsl, such that Tsl=(Ndiv1+½)·Tc, where Tc is the period of the received signal carrier. To achieve this, the switch SW1 is made conducting from 0 to Tsl. The second signal sample is then obtained by passing current in the second capacitor CR during the period from Tsl to 2Tsl, the switch SW2 being made conducting from Tsl to 2Tsl, the third signal sample is obtained by passing current in the third capacitor CR during the period from 2Tsl to 3Tsl, the switch SW3 being made conducting from 2Tsl to 3Tsl, and so on. Therefore, this is equivalent to successively integrating the signal over the sampling period Tsl such that Tsl=(Ndiv1+½)·Tc, after having multiplied it by the carrier frequency for which the phase is zero at the beginning of each sampling period (which is why there are phase skips at the mixer).

This type of signal integration is equivalent to a convolution of the signal with the carrier frequency Fc seen on a time window with width equal to the sampling period Tsl, thus making an anti-alias filter of the cardinal sine type centered on the carrier frequency Fc of the signal with zeros of the filter separated by multiples of the sampling frequency Fs1. Therefore in frequency, this is equivalent to multiplying the received signal with this cardinal sine. The anti-alias filter produced corresponds to the transfer function shown diagrammatically at the first stage of the I and Q channels in FIG. 8. Therefore the signal sampling operation at frequency $$Fs1 = \frac{Fc}{Ndiv1 + 1/2}$$

shown at 9, 10 in FIG. 8, includes anti-alias filtering eliminating signal frequencies that could fold onto the useful signal during sampling, while bringing the useful signal to half of the sampling frequency after sampling.

To give an example in the context of a GSM architecture, the carrier frequency is taken in a frequency band corresponding to 925-960 MHz, where Ndiv1=4, the corresponding sampling frequency is between 205 and 213 MHz.

The second stage in FIG. 8 after sampling shows the transfer function corresponding to filtering necessary to eliminate channels adjacent to the useful signal centered around half of the sampling frequency. The filtering principle already presented with reference to FIG. 4 is maintained. Since the signal is now kept centered around half of the sampling frequency, this has another consequence as already described, in that it is also centered around −Fs/2. Therefore, symmetric filters can be used to eliminate adjacent channels and such symmetric filters have the advantage of being real.

Filters used in the architecture according to prior art to eliminate adjacent channels can also easily be offset in frequency, to be centered on half of the sampling frequency Fs1/2. The filter spectrum can be offset by inverting the memory capacity with which the previously acquired samples are averaged at each stroke of the clock, in the circuit in FIG. 4. This circuit has a differential structure, so that such an operation can easily be implemented.

Finally, at least one additional undersampling operation—17, 18 at a new sampling frequency Fs2 less than Fs1 could be provided, including an anti-alias filtering step in the same way, bringing the useful signal to make it equal to half of the new sampling frequency after sampling. To keep the useful signal equal to half of the sampling frequency Fs2 after the additional sampling operation, the sampling frequency Fs1 must be divided by an odd number. Therefore the new sampling frequency Fs2 is determined as being equal to the sampling frequency Fs1 of the last sampling operation implemented, divided by an odd integer number Ndiv/2. In carrying out this sampling operation previously including the anti-alias filtering, for which the transfer function is shown diagrammatically in the third stage in FIG. 8, an average has to be taken between the last Ndiv2 samples as explained with reference to FIG. 4. However, according to the invention, due to the differential structure of the sampler mixing circuit in FIG. 4, the last Ndiv2 capacitances CR representing the last Ndiv2 samples of the acquired signal are averaged with each other, taken alternately on the positive side and the negative side of the circuit. The filtering thus obtained as shown on the third stage of FIG. 8, does not attenuate the signal around the frequency Fs1/2, where the useful signal is located and the zeros of the filter are moved away from Fs2 to eliminate frequencies that could fold on the useful band during sampling at Fs2/2. Therefore the sampling operation of the signal at frequency $$Fs2 = \frac{Fs1}{Ndiv2}$$

shown at 17, 18 in FIG. 8, includes the anti-alias filtering eliminating signal frequencies that could fold on the useful signal during sampling while bringing the useful signal to be equal to half of the sampling frequency Fs2/2 after sampling.

The final stage in FIG. 8 after sampling shows the transfer function corresponding to filtering necessary to eliminate channels adjacent to the useful signal centered around half of the sampling frequency Fs2, as described above.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not intended as limiting. The invention is limited only as defined in the following claims and the equivalents thereto.

The invention claimed is:

1. Method of sampling an analogue radiofrequency signal comprising reception of the analogue radiofrequency signal, sending of the received signal on two analogue channels, each channel performing a first signal sampling operation, including a filtering step (13, 14) eliminating signal frequencies that could fold on the useful signal during sampling such that the sampled signal represents a filtered version of the received signal, wherein the sampling frequency is taken to be equal to the frequency of the signal carrier divided by a factor $Ndiv1+\frac{1}{2}$, $Ndiv1$ being an integer number, to bring the useful signal to half of the sampling frequency after sampling.

2. Method according to claim 1, wherein the sampling operation including the anti-alias filtering step comprises generating filtered samples of the received signal at the sampling frequency, by successively integrating the received signal over the sampling period after having multiplied it by the carrier frequency for which the phase is zero at the beginning of each sampling period.

3. Method according to claim 2, wherein each successive integration comprises a signal convolution with the carrier frequency seen on a time window with its width equal to the sampling period, making a cardinal sine type filter centered on the carrier frequency of the signal with zeros of the filter separated by multiples of the sampling frequency.

4. Method according to claim 2, wherein samples of the received signal are produced by a plurality of capacitors forming a sampling circuit, the received signal previously being converted into current form and then integrated in each of the said transistors successively, the charge accumulated during the sampling period being representative of a filtered sample of the received signal.

5. Method according to claim 4, wherein the plurality of sampling capacitors being doubled up on the positive side and negative side of the sampling circuit, the additional sampling operation comprising averaging the $Ndiv2$ samples taken alternatively on the positive side and negative side of the circuit among themselves.

6. Method according to claim 5, wherein the averaging makes a cardinal sine type filter centred on the half of the last sampling frequency chosen with zeros of the filter separated by multiples of the new sampling frequency.

7. Method according to claim 4, wherein the filtering operation comprises averaging each sample with the charge accumulated by a memory capacitor, doubled up on the positive and negative side of the sampling circuit, the charge being representative of the received signal, the samples being averaged successively with the charge accumulated by the memory capacitor taken on the positive side and the negative side alternatively.

8. Method according to claim 1, wherein the received signal is subjected to at least one additional sampling operation at a new sampling frequency including an anti-alias filtering step, bringing the useful signal to half of the new sampling frequency after sampling, the new sampling frequency being determined as being equal to the sampling frequency of the last sampling operation applied divided by an odd integer number $Ndiv2$.

9. Method according to claim 1, wherein each sampling operation is followed by a filtering operation eliminating adjacent frequencies around the useful signal.

10. Method according to claim 1, wherein the sampling and filtering operations are done using CMOS technology.

11. Device for sampling an analogue radiofrequency signal including means for receiving the analogue radiofrequency signal, a first mixer that mixes the received signal with a signal output from a local oscillator at the carrier frequency of the received signal, the output from the said first mixer defining a first channel that will be sampled, a second mixer that mixes the received signal with the signal output from the said local oscillator in quadrature, the output from the second mixer defining a second channel that will be sampled, each mixer output being connected to sampling means including first filter means designed to previously eliminate frequencies of the mixed signal that could fold onto the useful signal during sampling, wherein the sampling means operate at a sampling frequency such that the ratio between the carrier frequency and the sampling frequency is equal to $Ndiv1+\frac{1}{2}$, where $Ndiv1$ is an integer number, so as to bring the useful signal to half of the sampling frequency after sampling.

12. Device according to claim 11, wherein each channel includes additional sampling means including anti-alias filtering means, the sampling means working at a new sampling frequency equal to the sampling frequency of the previous sampling means on the channel, divided by an odd integer number $Ndiv2$, so as to bring the useful signal to half of the new sampling frequency after sampling.

13. Device according to claim 11, including second filtering means designed to eliminate adjacent frequencies around the useful signal.

14. Device according to claim 11, made in integrated circuit form.

15. A radiofrequency signal reception terminal, comprising a device according to claim 11.

* * * * *

UNITED STATES PATENT AND TRADEMARK OFFICE
CERTIFICATE OF CORRECTION

PATENT NO. : 7,634,247 B2  
APPLICATION NO. : 11/664149  
DATED : December 15, 2009  
INVENTOR(S) : Loïc Joet et al.

Figure 1:
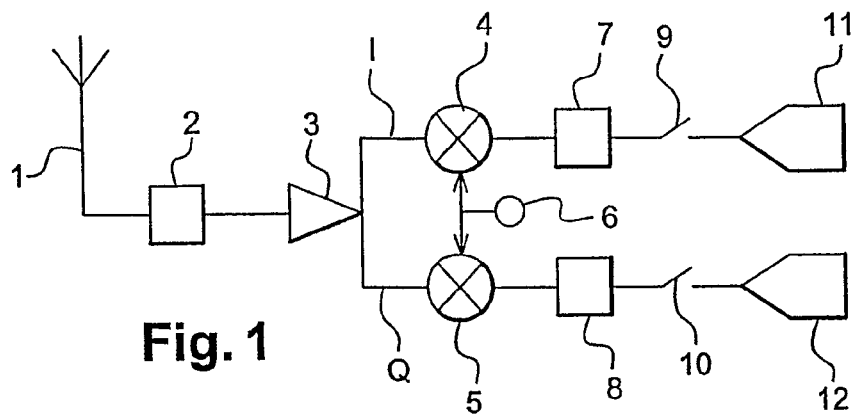
FIG. 1 shows a conventional "low-IF" architecture for a radiofrequency signal reception device, and has already been described.
Figure 2:
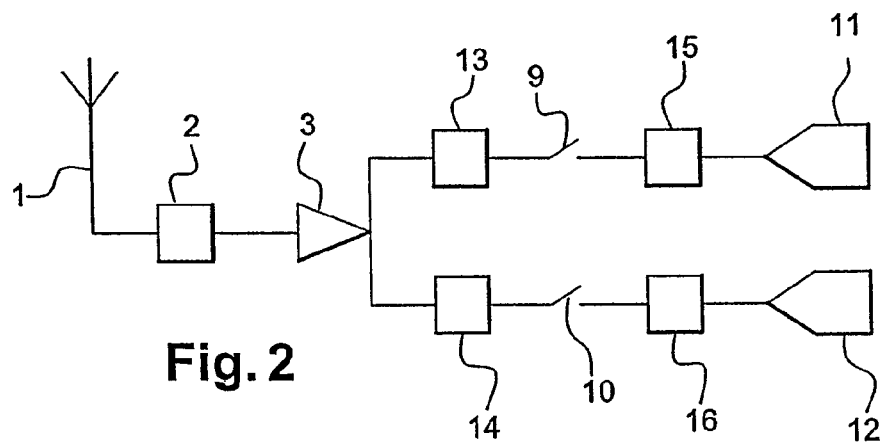
FIG. 2 diagrammatically shows an architecture for a radiofrequency reception device based on a particular sampling technique according to prior art and has already been described.
Figure 3:
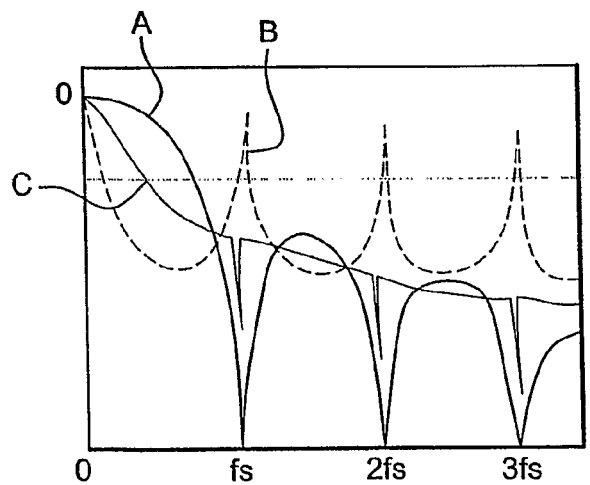
FIG. 3 shows the filtering transfer function according to the architecture in FIG. 2 and has already been described.

It is certified that error appears in the above-identified patent and that said Letters Patent is hereby corrected as shown below:

On the title page, item (54), and in the specification, column 1, line 1, the title should read:
METHOD OF SAMPLING AN ANALOGUE RADIO FREQUENCY SIGNAL On the title page, item (57), in the Abstract, lines 1, 2 and 3, should read:
A method for sampling an analog radio frequency signal comprising reception of the analog radio frequency signal, sending of the received signal on two analog channels, each In the Specification:

In column 1, line 2 should read:
RADIO FREQUENCY SIGNAL
    line 7 should read:
This invention relates to the radio frequency reception field
    line 9 should read:
of sampling an analog radio frequency signal and a device
    line 39 should read:
The state of the art proposes radio frequency reception sys-
    lines 49-50 should read:
FIG. 1 shows a classical "low-IF" architecture for a radio frequency signal reception device. This architecture results in
    lines 57-58 should read:
More precisely with reference to FIG. 1, the radio frequency signals received from an antenna 1 pass through a In column 3, line 7, should read:
based on a new radio frequency sampling technique, to elimi- In column 6, line 11, should read:
pling method for an analog radio frequency signal, this Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 7,634,247 B2 line 19 should read:
of integrating radio frequency reception systems and which in
  lines 24 and 25 should read:
invention is a sampling method for an analog radio frequency signal comprising reception of the analog radio frequency In column 7, lines 19 and 20 should read:
analog radio frequency signal including means for receiving the analog radio frequency signal, a first mixer that mixes the
  line 50 should read:
The invention also relates to a radio frequency signal recep-
  line 60 should read:
radio frequency signal reception device, and has already been
  line 63 should read:
radio frequency reception device based on a particular sam In column 9, lines 1 and 2, should read:
analog radiofrequency signal sampling device including means of receiving the analog radiofrequency signal formed In the Claims:

In claim 1, column 11, lines 6, 7 and 8 should read:
1. Method of sampling an analog radio frequency signal comprising reception of the analog radio frequency signal, sending of the received signal on two analog channels, each
  line 10 should read:
ing a filtering step eliminating signal frequencies that In claim 11, column 12, lines 18 and 19 should read:
11. Device for sampling an analog radio frequency signal including means for receiving the analog radio frequency In claim 15, column 12, line 47 should read:
15. A radio frequency signal reception terminal, compris-